United States Patent
Zhang et al.

(10) Patent No.: US 9,252,657 B2
(45) Date of Patent: Feb. 2, 2016

(54) PHASE-DISPLACEMENT OF A POWER CONVERTER IN A WIND TURBINE

(75) Inventors: Yanfeng Zhang, Singapore (SG); Eng Kian Kenneth Sng, Singapore (SG); Ji Qian, Singapore (SG); Tai Hock Khoo, Singapore (SG); Michael Casem Tumabcao, Singapore (SG)

(73) Assignee: Vestas Wind Systems A/S, Aarhus N (DK)

( * ) Notice: Subject to any disclaimer, the term of this patent is extended or adjusted under 35 U.S.C. 154(b) by 517 days.

(21) Appl. No.: 13/330,543

(22) Filed: Dec. 19, 2011

(65) Prior Publication Data

US 2012/0155125 A1 Jun. 21, 2012

Related U.S. Application Data

(60) Provisional application No. 61/424,279, filed on Dec. 17, 2010.

(30) Foreign Application Priority Data

Dec. 17, 2010 (DK) .................................. 2010 70551

(51) Int. Cl.
   *H02M 1/12* (2006.01)
   *H02M 1/44* (2007.01)
   *H02M 7/493* (2007.01)
   *H02M 5/458* (2006.01)
   *H02J 3/38* (2006.01)

(52) U.S. Cl.
   CPC ................ *H02M 1/44* (2013.01); *H02M 7/493* (2013.01); *H02J 3/386* (2013.01); *H02M 1/12* (2013.01); *H02M 5/458* (2013.01); *Y02E 10/763* (2013.01)

(58) Field of Classification Search
   CPC ........ H02M 1/12; H02M 1/44; H02M 5/4585; H02M 2005/2329; H02M 7/49; H02J 3/40; H02J 3/42; H02J 3/44; H02J 3/46; H02J 3/48; H02J 3/50
   USPC ...................... 363/34, 37, 39–42, 65, 69, 71
   See application file for complete search history.

(56) References Cited

U.S. PATENT DOCUMENTS

| 5,070,440 | A  | * | 12/1991 | Walker .......................... 363/137 |
| 5,083,039 | A  | * | 1/1992  | Richardson et al. ............ 290/44 |
| 5,198,971 | A  | * | 3/1993  | Recker et al. .................. 363/71 |
| 5,434,771 | A  | * | 7/1995  | Danby et al. ................... 363/41 |
| 7,446,435 | B2 | * | 11/2008 | Zhang et al. ................... 363/41 |
| 7,778,324 | B2 | * | 8/2010  | Stanley ......................... 375/238 |
| 8,138,620 | B2 | * | 3/2012  | Wagoner et al. ............... 290/44 |
| 2010/0133831 | A1 | * | 6/2010 | Scholte-Wassink et al. ... 290/44 |

FOREIGN PATENT DOCUMENTS

EP   1796254 A2   6/2007

* cited by examiner

*Primary Examiner* — Adolf Berhane
*Assistant Examiner* — Jye-June Lee
(74) *Attorney, Agent, or Firm* — Patterson & Sheridan, LLP (57) ABSTRACT

A wind turbine generator comprising: an electrical generator configured to generate AC signals, a plurality of power converters operated by a gating signal, each power converter configured to convert the AC signals from electrical generator into fixed frequency AC signals, a transducer configured to measure the combined output from the power converters, and a controller configured to phase-displace the gating signal of one of the power converters to substantially minimize harmonic components of the combined output.

18 Claims, 10 Drawing Sheets

PHASE-DISPLACEMENT OF A POWER CONVERTER IN A WIND TURBINE

CROSS-REFERENCE TO RELATED APPLICATIONS

This application claims foreign priority benefits under 35 U.S.C. §119 to co-pending Danish patent application number PA 2010 70551, filed 17 Dec. 2010. This application also claims benefit of U.S. provisional patent application Ser. No. 61/424,279, filed 17 Dec. 2010. Each of the aforementioned related patent applications is herein incorporated by reference in its entirety.

FIELD OF THE INVENTION

The present invention relates to a system and/or a method for a wind turbine generator (WTG).

BACKGROUND OF THE INVENTION

Wind farms are commonly located in remote areas to take advantage of good wind conditions. Because of sometimes extreme conditions and the distance maintenance crew may have to travel, it is sometimes desirable to incorporate redundancy into the design of WTGs.

One component of a WTG that may be subject to faults or damage is a power electronic converter. In order to provide redundancy, it is known to provide multiple converters for each WTG. In normal operation each converter operates in parallel and is rated to take a share of the power generated by the WTG. If one of the converters fails, the WTG can continue to operate albeit with the power reduced to the lower combined converter capacity.

The grid code in each country is very strict about the maximum levels of current or voltage at frequencies other than the grid frequency of 50 Hz or 60 Hz. Currents or voltages at frequencies other than the grid frequency are called harmonics and are typically generated by power electronic devices, such as the power electronic converter in a WTG. As a result WTGs typically include filtering to ensure that any harmonics generated are filtered out to a level that complies with the grid code.

One of the primary harmonics generated by the power electronic converter in a WTG, is at the switching frequency. This may typically be of the order of several kHz and may require significant filtering requirements. With multiple parallel converters there is the possibility of reducing the harmonic filtering requirement at the switching frequency, by "interleaving" the converters. In interleaving the switching waveforms of each converter are displaced in phase over a switching period. In this way the switching harmonic is spread over to higher frequencies and reduced in amplitude, which may reduce the cost of the filters.

Prior art interleaving systems generally incorporate a clock synchronisation system so that the switching waveforms of each converter are correctly displaced in phase relative to each other. For example if three converters were interleaved the switching waveforms should each be spaced 120 degrees relative to each other to give maximum benefit. In order to accurately achieve 120 degree spacing, the clocks may need to be synchronised. Accurate clock synchronisation may add to the cost and complexity of the design and/or may reduce reliability. Also if one of the converters trips out, the remaining converters may need to restart and resynchronise.

SUMMARY OF THE INVENTION

In general terms the embodiments herein proposes monitoring an indicator of the harmonics at the switching frequency and iteratively adjusting the delay of one or more interleaved converters to minimise the indicator. This may have the advantage that synchronisation is not required and/or that a restart is not necessary if one of the converters trip.

In one embodiment, there is provided a wind turbine generator comprising:
an electrical generator configured to generate AC signals,
a plurality of power converters operated by a gating signal, each power converter configured to convert the AC signals from the electrical generator into fixed frequency AC signals,
a transducer configured to measure the combined output from the power converters, and
a controller configured to phase-displace the gating signal of one of the power converters to substantially minimise harmonic components of the combined output.

The gating signal may have a switching frequency and the controller may be configured to substantially minimise harmonic components substantially at the switching frequency of the combined output.

The transducer may be a current transducer and the controller may be configured to substantially minimise harmonic components of the combined output current.

The controller may be configured to select a reference power converter, for which the gating signal is not phase-displaced and to alternatively phase-displace the gating signals of the remaining converters.

The controller may be configured to determine an indicator of the harmonic components substantially at the switching frequency of the combined output.

The phase-displacement may be iteratively adjusted to substantially minimise the indicator.

The plurality of converters may be operated in an interleaved manner.

In another embodiment, there is provided a method of controlling a wind turbine generator comprising:
determining an indicator of harmonics in an output of a plurality of power converters,
incrementing a phase-displacement of a gating signal for a first of the power converters,
if the indicator indicates that the harmonics have decreased, further incrementing the phase-displacement for the first power converter, and
if the indicator indicates that the harmonics have increased, decrementing the phase-displacement for the first power converter.

The method may be repeated for a predetermined period.

After the predetermined period the method may be repeated on a second of the power converters.

A third of the power converters may be selected as a reference and the phase-displacement of the third power converter may not be incremented or decremented.

The determining the indicator may comprise determining an harmonic magnitude substantially at the switching frequency in the output current of the power converters.

The determining the harmonic magnitude may comprise:
adding the square of each of the phase output currents,
inverse notch filtering the addition,
integrating each cycle of the inverse notch filtration, and
averaging the integration using a weighted moving average function.

In another embodiment, a wind turbine comprises an electrical generator configured to generate AC signals and a plurality of power converters operated by a gating signal. Each power converter is configured to convert the AC signals from the electrical generator into fixed frequency AC signals. The wind turbine also includes a transducer configured to measure the combined output from the power converters and a controller configured to phase-displace the gating signal of one of the power converters to substantially minimise harmonic components of the combined output.

BRIEF DESCRIPTION OF THE DRAWINGS

In order that the invention may be fully understood and readily put into practical effect there shall now be described by way of non-limitative example only, an example embodiment described below with reference to the accompanying illustrative drawings in which:

FIG. 1b shows the controllers for the WTG in FIG. 1a;

DESCRIPTION OF EMBODIMENTS

A WTG generally includes a set of blades, a generator and a power converter. The turbine blades are rotated about a shaft by the wind and are mounted in a nacelle on a tower relatively high off the ground to ensure good airflow. The electrical generator is driven by the rotating shaft to produce typically alternating current (AC) voltage which varies in magnitude and frequency according to the wind speed. A gearbox may be used to step up the slow rotational speed of the shaft to a high rotational speed suitable for operating the generator. The generator may either be synchronous or asynchronous. The power converter converts and transfers power from the generator to the grid as described below.

Figure 1A:
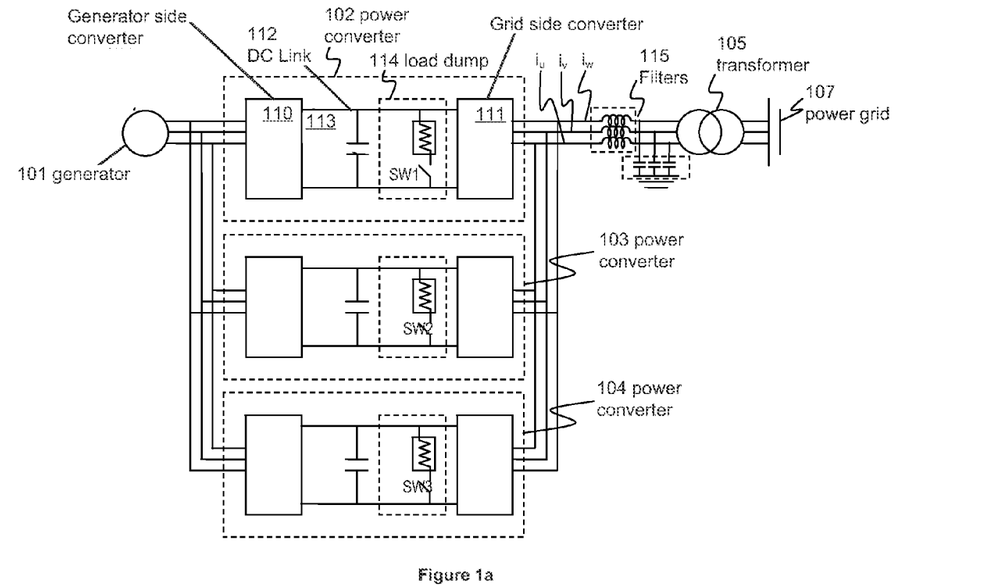
FIG. 1a is an electrical schematic of a drive train system for a full scale converter based WTG.

FIG. 1a shows an electrical system of the wind turbine according to one embodiment. The electrical system includes a generator 101, a first power converter 102, second power converter 103, a third power converter 104 and a main transformer 105.

The first power converter 102 includes a generator-side converter 110 and a grid-side converter 111 connected via a direct current (DC) link 112. The DC-link 112 includes a DC-link capacitor 113. The second power converter 103 and the third power converter 104 may be configured identically to, and connected in parallel with, the first converter 102.

The generator 101 converts mechanical energy to electrical energy having AC (alternating current) voltage and current (collectively referred to as "AC signals"), and provides the generated AC signals to each generator-side converter 110. The AC signals from the generator have a variable frequency, due to varying wind. Each generator-side converter 110 converts or rectifies the AC signals to a DC (direct current) voltage and a DC current (collectively known as "DC signals") towards each DC-link 112. A load dump 114 is provided to control the DC voltage on each DC-link 112 by absorbing any excess amount of active power. Each grid-side converter 111 converts the DC signals from the DC-link 112 into fixed frequency AC signals for a power grid 107. The transformer 105 transforms the grid voltage to a suitable level on the low voltage side according to the drive train system hardware design. The power output of each grid-side converter 111 is fed to the power grid 107 through main transformer 105. The transmissions lines may be connected directly to the grid or, if in a wind farm, join with other transmission lines at a point of common connection before connecting to the grid. Filters 115 in the form of capacitors, inductors and resistors are also located between the common output point of each grid-side converter 111, and the power grid 107. Normally, a passive filter carries two branches: a main harmonic filter branch (capacitor banks) to absorb harmonics and a resonance branch (capacitors, small chokes and small resistors) to damp resonance phenomenon. The filter may also include other components such as contactors, fuses, sensors etc. A wide bandwidth three phase current transducer 125 (shown in FIG. 1b) may be located between the common output point of the power converters 102,103,104 and the filters, to measure phase currents $i_u$ $i_v$ $i_w$.

It should be noted that the electrical system described with reference to FIG. 1a is only an example of the electrical configuration of the wind turbine and only the main components are shown to illustrate the embodiments. The present invention should not be limited to the exact electrical system configuration shown in FIG. 1a. Other electrical configurations are possible. For example while 3 power converters are shown, more or less converters may be provided depending on interleaving/redundancy requirements. Also, many components in the electrical system of the wind turbine are not shown in FIG. 1a. For example, the electrical system may include filters between the generator 101 and the power converters. Also, there may be switches arranged at various locations for connecting or disconnecting certain components of the turbine.

Figure 1B:
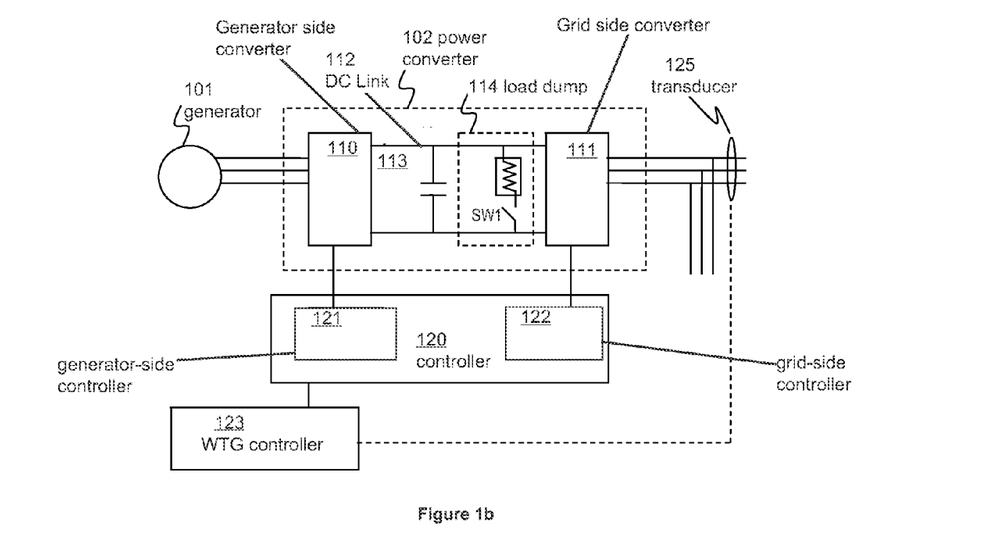

FIG. 1b illustrates the controllers for the first power converter 102. Under normal conditions an overall WTG controller 123 monitors the AC signals at the generator 101 and the grid 107, DC signals at the respective links 112 and the functional status of all components including the individual converters. According to a control strategy, the overall WTG controller 123 issues an active current reference command $I_a$ and a reactive current reference command $I_r$ to deliver a desired AC signal to the grid. $I_a$ and $I_r$ are simply split equally between the functioning converters. Each individual power converter has its own controller 120 which comprises a generator-side converter controller 121, and a grid-side converter controller 122 for controlling the generator-side converter 110 and the grid-side converter 111, respectively. The grid-side converter controller 122 may also control a load dump switch (SW1) of the load dump 114. The WTG controller 123 controls the converter controller 120.

Figure 2:
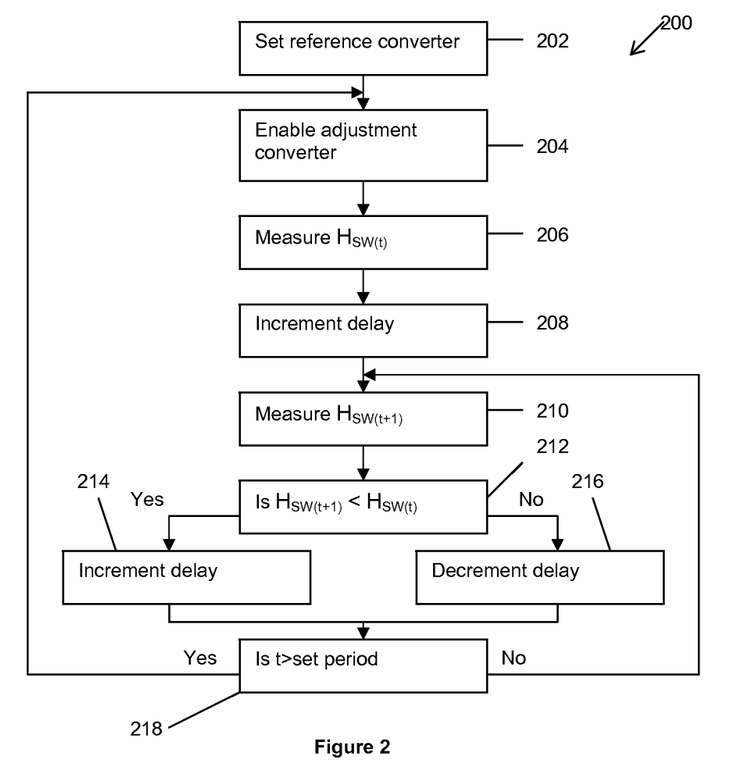
FIG. 2 is a flow diagram of the control strategy for minimising the harmonic current at the switching frequency according to an embodiment.

In order to implement interleaving according to one embodiment, a method 200 of switching harmonic minimisation is shown in FIG. 2. Firstly a first individual converter controller is set as reference 202. Then a second individual converter controller is delay adjustment enabled 204. An indicator ($H_{SW(t)}$) of the magnitude of the harmonic current at the switching frequency at the input of the filters 115 is then determined at time=t 206. Next the delay of the switching waveform for the enabled individual converter is incremented at time=t+1 208. $H_{SW(t+1)}$ is then determined 210. Next it is determined whether $H_{SW(t+1)}$ is smaller than $H_{SW(t)}$ 212. If yes the delay is further incremented 214. If no the delay is decremented 216. Steps 210-216 are repeated continuously. After a set period e.g.: 50 ms the delay adjustment is disabled for the second individual converter controller and enabled for a third individual converter controller 218. Steps 206-216 are repeated continuously for the third individual converter controller. After the set period the delay adjustment is disabled for the third individual converter controller and re-enabled for the second individual converter controller, and so on.

The various determinations may be made at the overall WTG controller 123 and the increment or decrement signals sent to the enabled individual converter controller 120. Alternatively the overall WTG controller 123 may simply send the $H_{SW}$ signal to the enabled individual converter controller 120 and the determination made locally.

In the method 200 a minimisation problem for $H_{SW}$ is approximately solved. Other methods of solving the minimisation problem may also be used. The value of $H_{SW}$ may also be determined in a number of ways. For example $H_{SW}$ may be measured directly using digital signal processing hardware and/or algorithms. Alternatively an approximation of the harmonic current at the switching frequency may be determined as follows:

The combined phase currents $i_u, i_v, i_w$ are measured between the power converters 102,103,104 and the filters 115. The current sampling should be at least 8-10 times the switching frequency. A function $f(i_u,i_v,i_w)$ is then determined according to Equation 1:

$$f(i_u,i_v,i_w)=i_u^2+i_v^2+i_w^2 \quad (1)$$

Then a reverse notch filter (as shown Equation 2 in Laplace format) and absolute function is applied to equation 1 to extract the signal $F(f_{sw})$ that contains switching harmonic information.

$$\frac{k*2*\pi*f_{sw}*s}{s^2+k*2*\pi*f_{sw}*s+(2*\pi*f_{sw})^2} \quad (2)$$

where gain k determines the bandwidth of this filter, $f_{SW}$ is the switching frequency. Simulation results shows that $F(f_{sw})$ has a frequency of 300 Hz (6 times of 50 Hz). Alternatively, the switching frequency may be 360 Hz (6 times of 60 Hz). Then $F(f_{sw})$ is integrated with a reset every 1/300 sec, as shown in equation (3).

$$I(N)=\int_{NT}^{NT+t}F(f_{sw})dt \quad (3)$$

where T=1/300, N=0, 1, 2 . . . , n−1, n. Then a weighted moving average is calculated based on the peak of the integration function, as shown in equation (4)

$$Hsw=5*\max(I(n))+3*\max(I(n-1))+\max(I(n-2))+\max(I(n-3)) \quad (4)$$

Figure 3:
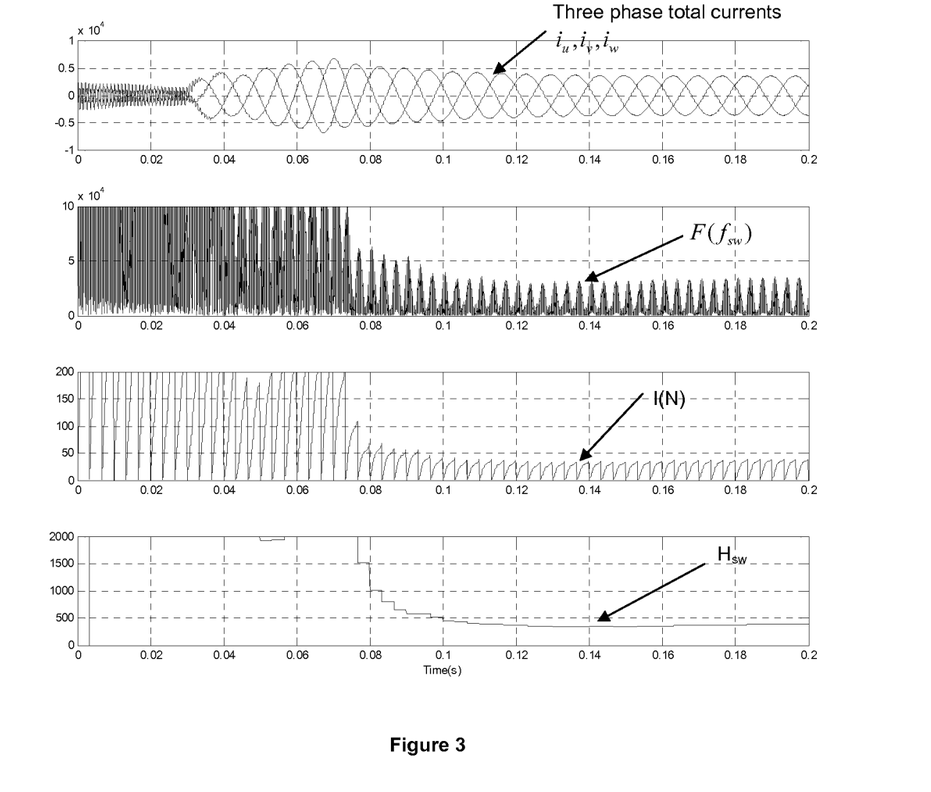
FIG. 3 is a graph of simulation results to show the validity of the proposed indicator for harmonic current at the switching frequency without interleaving.
Figure 10:
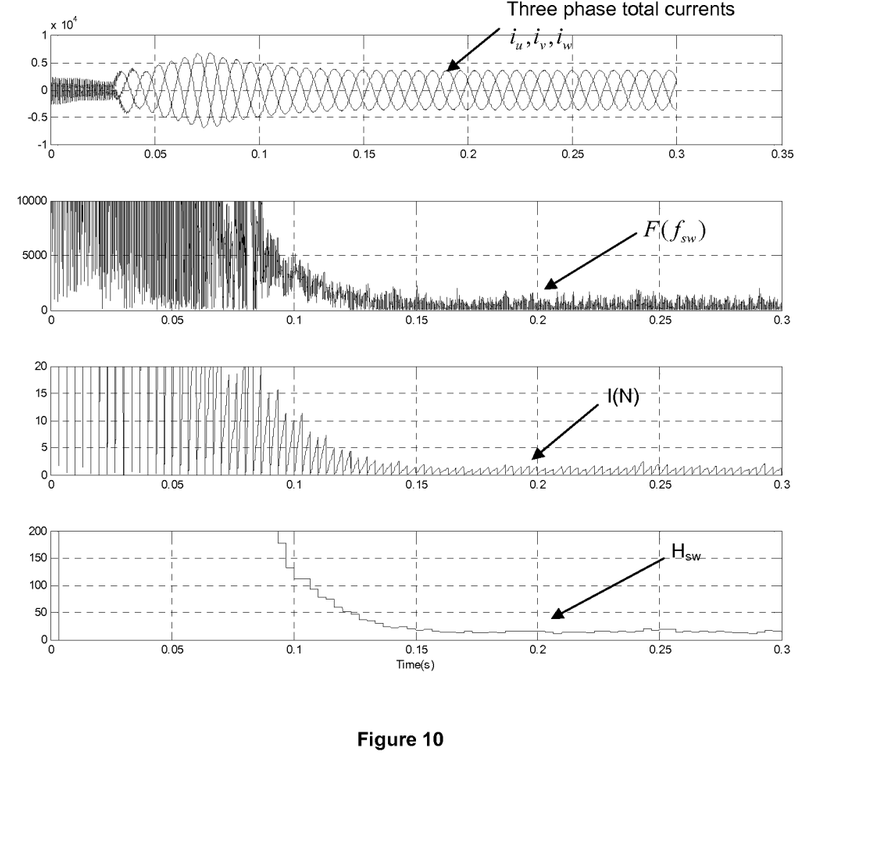
FIG. 10 is a graph of the proposed indicator in a traditional synchronised interleaving configuration.

In order to test the efficacy of the above approximation of the harmonic current, various simulation results will now be discussed. Firstly a test case with 3 conventional parallel converters without interleaving was simulated. In FIG. 3 simulation results show that, with a switching frequency $f_{SW}$, the function $H_{SW}$ is a constant in steady state. Also if interleaving is employed, when $T_d$=switching period $(T_{PWM})$/number of power converters (N) as (per the ideal delay for minimum switching harmonics in a traditional synchronised interleaved configuration), $H_{SW}$ is minimized as shown in FIG. 10. Thus $H_{SW}$ can be used as a reliable predictor to determine whether a change in PWM delay is in the correct direction.

Figure 4:
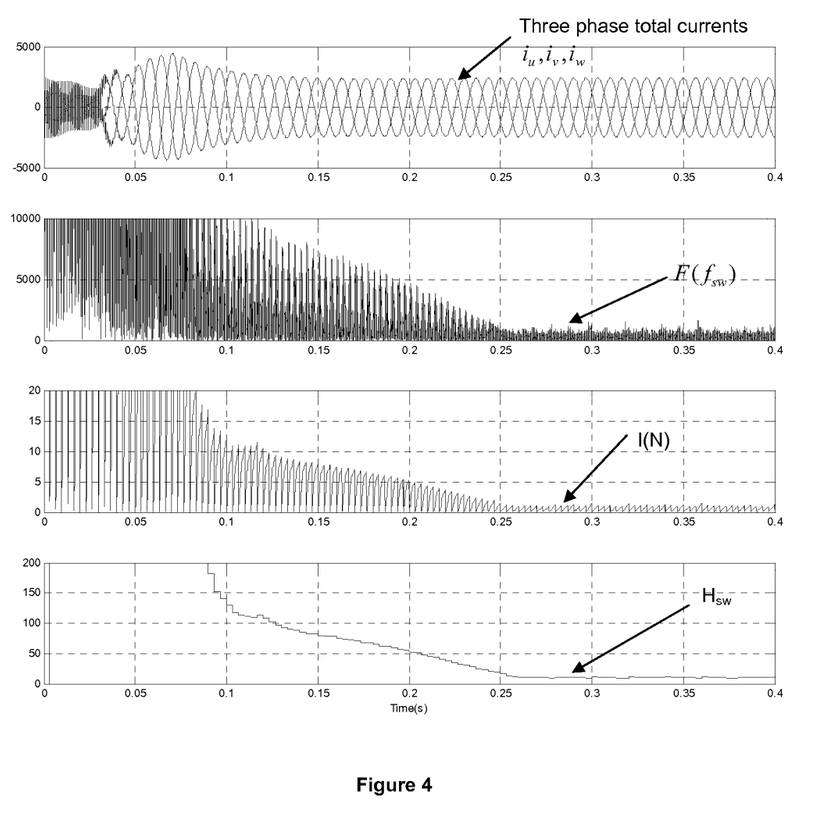
FIGS. 4 and 5 are graphs of simulation results for 2 converters using the method in FIG. 2.
Figure 5:
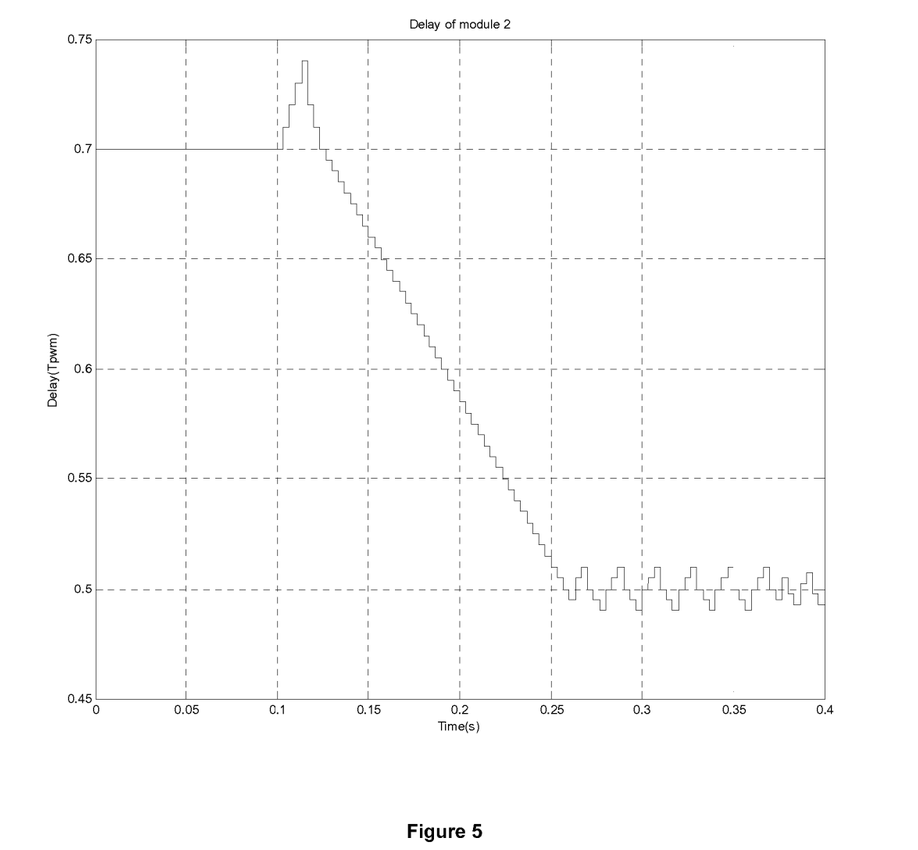

Next a test case with 2 parallel power converters was simulated. In the simulation, the first power converter is set as the reference and its delay is not adjusted. After 100 ms the second power converter has the PWM delay iteratively adjusted using $H_{SW}$ as per the method 200. In FIGS. 4 and 5 it can be seen that after around 250 ms (150 ms of adjustment), the PWM delay converges to $T_{PWM}/2$ (for the case of two converters this is 0.5 of the switching period as shown in FIG. 5), and at the same time $H_{SW}$ reaches minimum as well.

Figure 6:
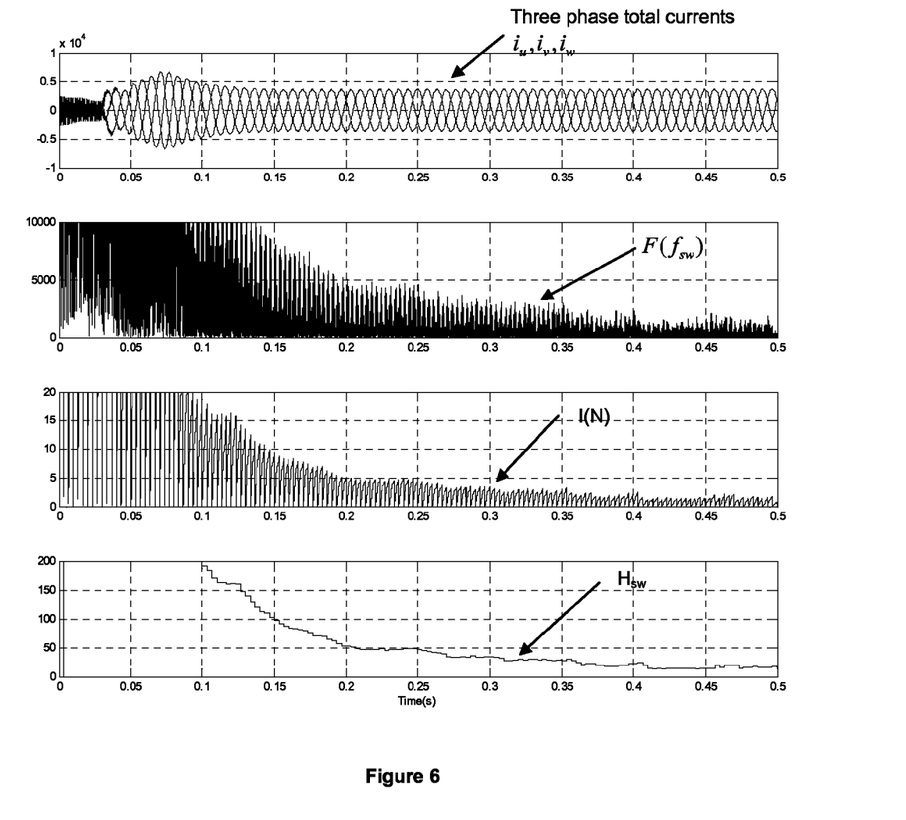
FIGS. 6 and 7 are graphs of simulation results for 3 converters using the method in FIG. 2.
Figure 7:
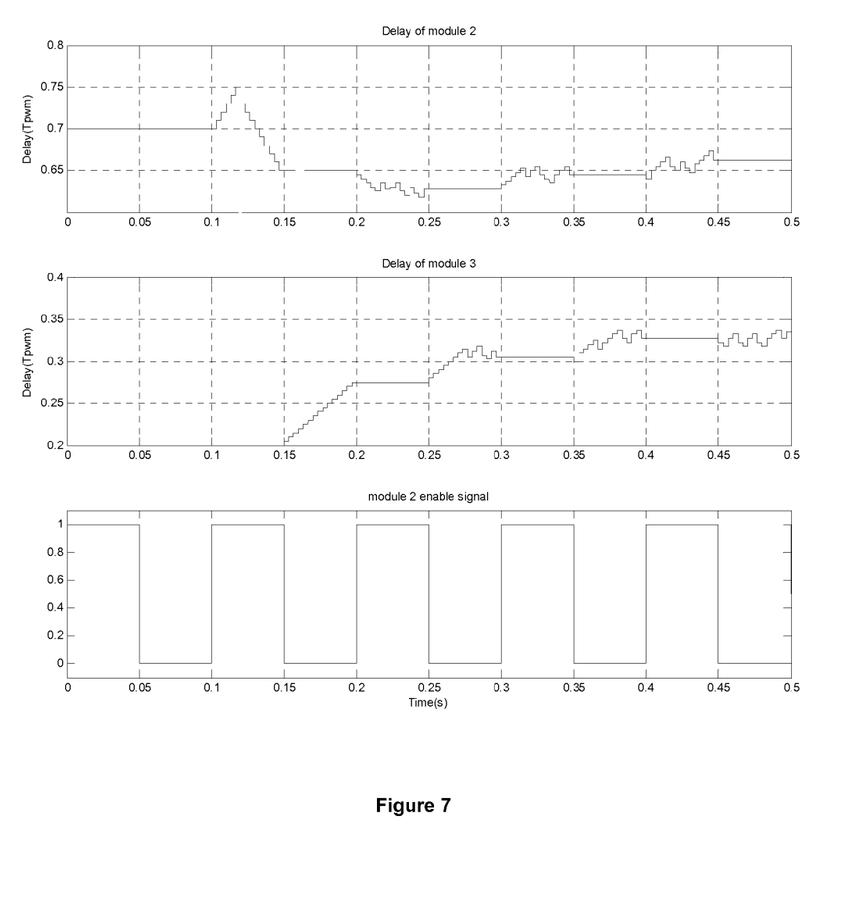

Next a test case with 3 parallel power converters was simulated. In the simulation, the first power converter is set as the reference and its delay is not adjusted. For the first 100 ms no adjustment takes place, to allow the system to reach near steady state. Then the second and third power converters are alternatively adjusted every 50 ms using $H_{sw}$ as per the method 200. FIG. 7 that after around 400 ms (300 ms of adjustment), the PWM delay of the second power converter converges to around $2*T_{PWM}/3$ (in this Case about 0.67) and the PWM delay of the third power converter converges to around $T_{PWM}/3$ (is this case about 0.33). At the same time, FIG. 6 shows $H_{SW}$ converges to the minimum as well.

Figure 8:
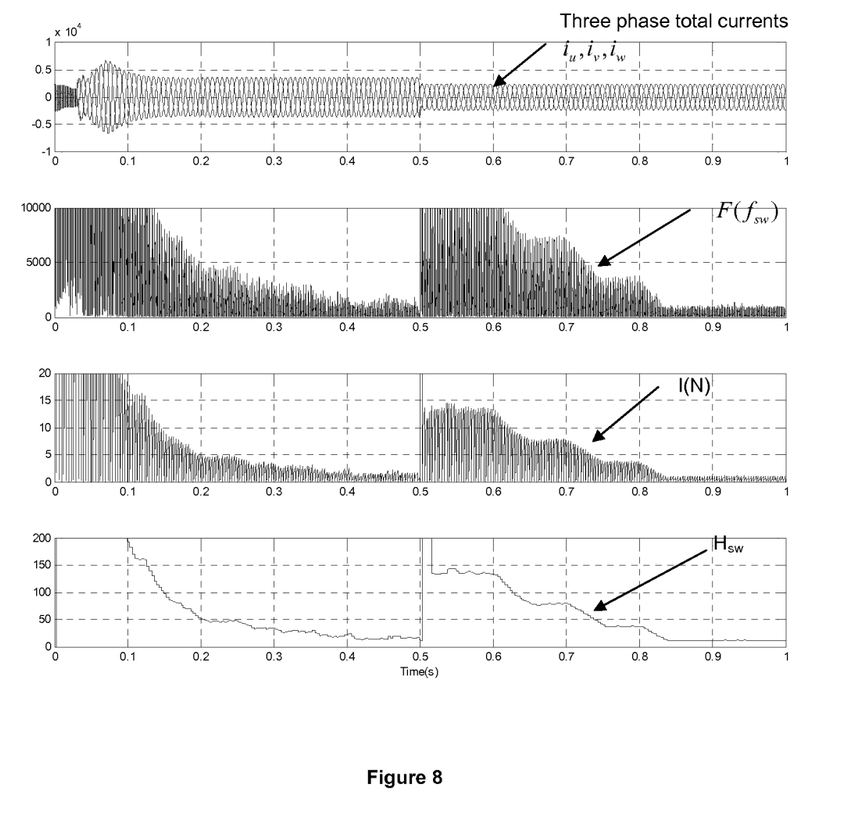
FIGS. 8 and 9 are graphs of simulation results for 3 converters using the method in FIG. 2 where 1 converter is subsequently disabled.
Figure 9:
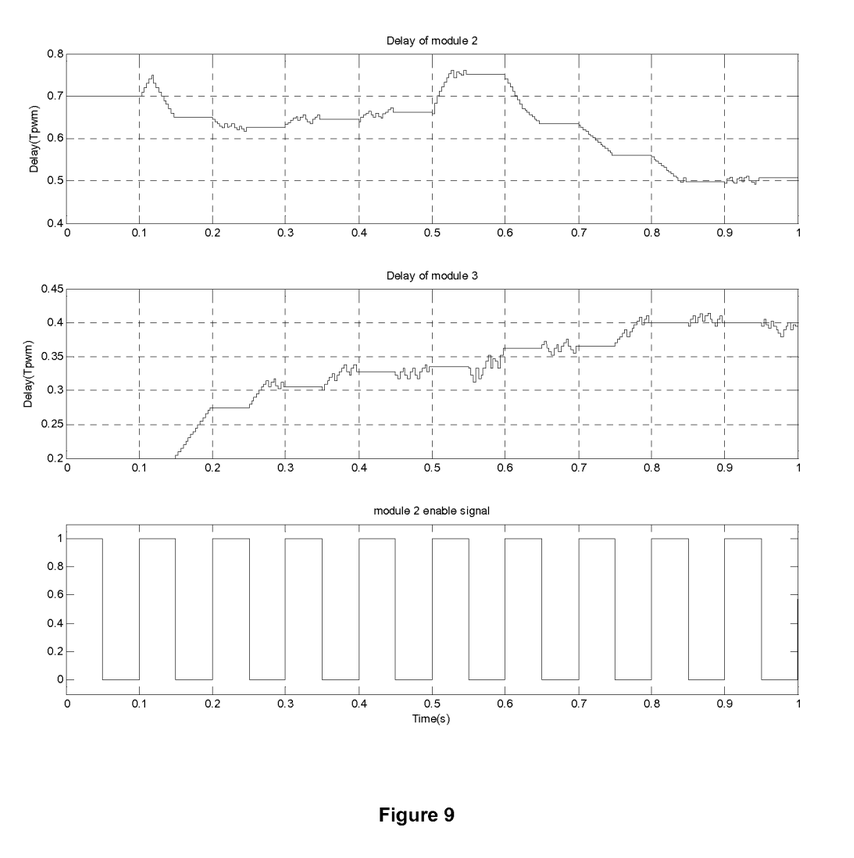

Next a test case with 3 parallel power converters was simulated, where subsequently one of the power converters is disabled to simulate a fault. In the simulation, the first power converter is set as the reference and its delay is not adjusted. For the first 100 ms no adjustment takes place. Then the second and third power converters are alternatively adjusted every 50 ms using $H_{SW}$ as per the method 200. As can be seen in FIGS. 8 and 9, after about 300 ms the adjustment reaches near steady state and the delays converge at 0.67 and 0.33. Then at 500 ms the third power converter is disabled, and as can be seen in FIG. 8, the total current is reduced to about 2/3. FIG. 9 shows that after around 850 ms (350 ms of adjustment after the other converter is disabled), the PWM delay of the second power converter converges to 0.5. This shows the method 200 is robust even in the case of a single power converter failure. Also if the reference converter fails, the WTG controller 123 will set another healthy converter as a new reference.

While embodiments of the invention have been described in detail, many variations are possible within the scope of the invention as claimed as will be clear to a skilled reader. As an example voltage may be used in place of current to measure the harmonics at the switching frequency.

One or more embodiments may have the advantage that:
Complicated synchronisation systems may not be required;
Close to ideal interleaving results may be achieved after very short iteration periods;
If a single power converter fails, interleaving may still be recovered without a restart; and/or
Increased reliability and less maintenance may be required.

We claim:
1. A wind turbine generator comprising:
an electrical generator configured to generate AC signals;
a plurality of power converters operated by a gating signal, each power converter configured to convert the AC signals from the electrical generator into fixed frequency AC signals;
a transducer configured to measure a combined output from the plurality of power converters; and
a controller configured to:
select a reference power converter of the plurality of power converters, for which a gating signal is not phase-displaced, and
iteratively adjust a phase-displacement of a gating signal of a first one of the plurality of power converters relative to the gating signal of the reference power converter using the combined output measured by the transducer to minimize harmonic components of the combined output.

2. The wind turbine generator in claim 1, wherein the gating signal has a switching frequency and the controller is configured to minimize the harmonic components substantially at a switching frequency of the combined output.

3. The wind turbine generator in claim 2, wherein the controller is configured to determine an indicator of the harmonic components substantially at the switching frequency of the combined output.

4. The wind turbine generator in claim 3, wherein the phase-displacement is iteratively adjusted to minimize the indicator.

5. The wind turbine generator in claim 1, wherein the transducer is a current transducer.

6. The wind turbine generator of claim 1, wherein the controller is configured to alternatively phase-displace gating signals of at least two converters of the plurality of power converters.

7. The wind turbine generator in claim 1, wherein the plurality of power converters are operated in an interleaved manner.

8. A method of controlling a wind turbine generator comprising:
   (i) determining an indicator of harmonics in an output of a plurality of power converters;
   (ii) incrementing a phase-displacement of a gating signal for a first one of the power converters;
   (iii) if the indicator indicates that the harmonics have decreased, further incrementing the phase-displacement for the first power converter; and
   (iv) if the indicator indicates that the harmonics have increased, decrementing the phase-displacement for the first power converter;
   (v) repeating elements (i)-(iv) for a predetermined period; and
   (vi) after the predetermined period, repeating elements (i)-(iv) on a second one of the power converters.

9. The method in claim 8, wherein a third one of the power converters is selected as a reference and a phase-displacement of the third power converter is not incremented or decremented.

10. The method in claim 8, wherein determining the indicator comprises determining a harmonic magnitude substantially at a switching frequency in an output current of the plurality of power converters.

11. The method in claim 10, wherein the determining the harmonic magnitude comprises:
   adding the square of each of a phase output currents,
   inverse notch filtering the addition,
   integrating each cycle of the inverse notch filtration, and
   averaging the integration using a weighted moving average function.

12. A wind turbine comprising:
   an electrical generator configured to generate AC signals;
   a plurality of power converters operated by a gating signal, each of the plurality of power converter configured to convert the AC signals from the electrical generator into fixed frequency AC signals;
   a transducer configured to measure a combined output from the plurality of power converters; and
   a controller configured to:
      select a reference power converter of the plurality of power converters, for which a gating signal is not phase-displaced, and
      iteratively adjust a phase-displacement of a gating signal of a first one of the plurality of power converters relative to the gating signal of the reference power converter using the combined output measured by the transducer to minimize harmonic components of the combined output.

13. The wind turbine of claim 12, wherein the gating signal has a switching frequency and the controller is configured to minimize the harmonic components substantially at a switching frequency of the combined output.

14. The wind turbine in claim 13, wherein the controller is configured to determine an indicator of the harmonic components substantially at the switching frequency of the combined output.

15. The wind turbine in claim 12, wherein the transducer is a current transducer.

16. The wind turbine in claim 12, wherein the controller is configured to alternatively phase-displace the gating signals of at least two converters of the plurality of converters.

17. The wind turbine in claim 12, wherein the plurality of converters are operated in an interleaved manner.

18. A method of controlling a wind turbine generator comprising:
   determining an indicator of harmonics in an output of a plurality of power converters, wherein determining the indicator comprises determining a harmonic magnitude substantially at a switching frequency in an output current of the plurality of power converters, wherein the determining the harmonic magnitude comprises:
      adding the square of each of a phase output currents,
      inverse notch filtering the addition,
      integrating each cycle of the inverse notch filtration, and
      averaging the integration using a weighted moving average function;
   incrementing a phase-displacement of a gating signal for a first one of the power converters;
   if the indicator indicates that the harmonics have decreased, further incrementing the phase-displacement for the first power converter; and
   if the indicator indicates that the harmonics have increased, decrementing the phase-displacement for the first power converter.

* * * * *